United States Patent
Gaskins (10) Patent No.: US 7,590,787 B2
(45) Date of Patent: Sep. 15, 2009

(54) APPARATUS AND METHOD FOR ORDERING TRANSACTION BEATS IN A DATA TRANSFER

(75) Inventor: Darius D. Gaskins, Austin, TX (US)

(73) Assignee: Via Technologies, Inc., Taipei (TW)

( * ) Notice: Subject to any disclaimer, the term of this patent is extended or adjusted under 35 U.S.C. 154(b) by 39 days.

(21) Appl. No.: 11/379,166

(22) Filed: Apr. 18, 2006

(65) Prior Publication Data
US 2007/0022239 A1 Jan. 25, 2007

Related U.S. Application Data

(60) Provisional application No. 60/700,692, filed on Jul. 19, 2005.

(51) Int. Cl.
*G06F 13/14* (2006.01)

(52) U.S. Cl. .................. 710/305; 710/306; 711/202

(58) Field of Classification Search ......... 710/305–306, 710/100, 240–244, 113; 711/202
See application file for complete search history.

(56) References Cited

U.S. PATENT DOCUMENTS

| | | | |
|---|---|---|---|
| 4,796,232 A | 1/1989 | House | |
| 5,255,378 A | 10/1993 | Crawford et al. | |
| 5,537,624 A | 7/1996 | Whitesell | |
| 5,561,780 A | 10/1996 | Glew et al. | |
| 5,640,517 A * | 6/1997 | Parks et al. ................. | 710/105 |
| 5,644,788 A | 7/1997 | Courtright et al. | |
| 5,835,741 A | 11/1998 | Elkhoury et al. | |
| 5,901,298 A | 5/1999 | Cummins et al. | |
| 5,915,126 A | 6/1999 | Maule et al. | |
| 5,919,254 A | 7/1999 | Pawlowski et al. | |
| 5,944,806 A | 8/1999 | Melvin et al. | |
| 5,960,453 A | 9/1999 | Pawlowski | |
| 6,012,116 A * | 1/2000 | Aybay et al. ................. | 710/113 |
| 6,032,225 A | 2/2000 | Shiell et al. | |
| 6,189,082 B1 * | 2/2001 | Ramamurthy ................ | 711/202 |
| 6,311,245 B1 | 10/2001 | Klein | |

(Continued)

FOREIGN PATENT DOCUMENTS

EP 1242898 9/2002

(Continued)

OTHER PUBLICATIONS

Sakamoto et al. "Microarchitecture and performance analysis of a SPARC-V9 microprocessor for enterprise server systems." High-Performance Computer Architecture. 2003. HPCA-9 2003. Proceedings. Feb. 8-12, 2003, Abstract Only.

*Primary Examiner*—Clifford H Knoll
*Assistant Examiner*—Kim T Huynh
(74) *Attorney, Agent, or Firm*—Gary R. Stanford; Richard K. Huffman; James W. Huffman (57) ABSTRACT

A microprocessor including a cache memory and bus interface logic. The bus interface logic is interfaced with request signals and data signals and includes a request interface and a response interface. The request interface provides a request via the request signals for a data transaction in which the request specifies a selected burst order. The response interface stores data received via the data signals into the cache memory according to the selected burst order. The request interface may specify the selected burst order by configuring a field of a request packet during a request phase of the data transaction. The selected burst order may selected from any of several different data transaction orderings, including an interleaved order, a linear order, a nibble linear order and a custom order. The microprocessor may further include instruction logic which provides an instruction to the bus interface logic specifying the selected burst order.

14 Claims, 4 Drawing Sheets

PACKET REQB VALUE FOR DYNAMIC BURST ORDERING — 400

| REQ[4:0] VALUE | QUADWORD ORDERING |
|---|---|
| 00XXXB | NIBBLE LINEAR |
| 01XXXB | LINEAR |
| 10XXXB | CUSTOM |
| 11XXXB | INTERLEAVED |

U.S. PATENT DOCUMENTS

| | | |
|---|---|---|
| 6,356,270 B2 | 3/2002 | Pentkovski et al. |
| 6,405,280 B1 | 6/2002 | Ryan |
| 6,405,285 B1 | 6/2002 | Arimilli et al. |
| 6,434,654 B1 | 8/2002 | Story et al. |
| 6,505,259 B1 | 1/2003 | Garcia et al. |
| 6,523,109 B1 | 2/2003 | Meier |
| 6,601,121 B2 | 7/2003 | Singh et al. |
| 6,609,171 B1 | 8/2003 | Singh et al. |
| 6,671,752 B1 | 12/2003 | Rao et al. |
| 6,742,160 B2 | 5/2004 | Greiner |
| 6,804,735 B2 | 10/2004 | Singh et al. |
| 6,807,592 B2 | 10/2004 | Singh et al. |
| 6,907,487 B2 | 6/2005 | Singh et al. |
| 6,954,208 B2 | 10/2005 | Doyle et al. |
| 7,130,952 B2 | 10/2006 | Nanki et al. |
| 7,188,208 B2 * | 3/2007 | David et al. .................. 710/305 |
| 7,206,865 B2 | 4/2007 | Creta et al. |
| 2002/0029307 A1 | 3/2002 | Singh et al. |
| 2002/0103948 A1 | 8/2002 | Owen et al. |
| 2003/0088799 A1 | 5/2003 | Bodas |
| 2004/0199723 A1 | 10/2004 | Shelor |
| 2005/0066114 A1 * | 3/2005 | Barth et al. .................. 711/105 |
| 2006/0053243 A1 * | 3/2006 | David et al. .................. 710/305 |
| 2006/0190677 A1 | 8/2006 | Janzen |

FOREIGN PATENT DOCUMENTS

| | | |
|---|---|---|
| EP | 1416390 | 5/2004 |

\* cited by examiner

INTERLEAVED QUADWORD ORDERING — 300

| CRITICAL QUADWORD | TRANSFER ORDER |
|---|---|
| 0 | 0-1-2-3-4-5-6-7 |
| 1 | 1-0-3-2-5-4-7-6 |
| 2 | 2-3-0-1-6-7-4-5 |
| 3 | 3-2-1-0-7-6-5-4 |
| 4 | 4-5-6-7-0-1-2-3 |
| 5 | 5-4-7-6-1-0-3-2 |
| 6 | 6-7-4-5-2-3-0-1 |
| 7 | 7-6-5-4-3-2-1-0 |

*FIG. 3 (PRIOR ART)*

PACKET REQB VALUE FOR DYNAMIC BURST ORDERING — 400

| REQ[4:0] VALUE | QUADWORD ORDERING |
|---|---|
| 00XXXB | NIBBLE LINEAR |
| 01XXXB | LINEAR |
| 10XXXB | CUSTOM |
| 11XXXB | INTERLEAVED |

*FIG. 4*

LINEAR QUADWORD ORDERING — 500

| CRITICAL QUADWORD | TRANSFER ORDER |
|---|---|
| 0 | 0-1-2-3-4-5-6-7 |
| 1 | 1-2-3-4-5-6-7-0 |
| 2 | 2-3-4-5-6-7-0-1 |
| 3 | 3-4-5-6-7-0-1-2 |
| 4 | 4-5-6-7-0-1-2-3 |
| 5 | 5-6-7-0-1-2-3-4 |
| 6 | 6-7-0-1-2-3-4-5 |
| 7 | 7-0-1-2-3-4-5-6 |

*FIG. 5*

NIBBLE LINEAR ORDERING — 600

| CRITICAL QUADWORD | TRANSFER ORDER |
|---|---|
| 0 | 0-1-2-3-4-5-6-7 |
| 1 | 1-2-3-0-5-6-7-4 |
| 2 | 2-3-0-1-6-7-4-5 |
| 3 | 3-0-1-2-7-4-5-6 |
| 4 | 4-5-6-7-0-1-2-3 |
| 5 | 5-6-7-4-1-2-3-0 |
| 6 | 6-7-4-5-2-3-0-1 |
| 7 | 7-4-5-6-3-0-1-2 |

*FIG. 6*

CUSTOM ORDERING — 700

| CRITICAL QUADWORD | TRANSFER ORDER |
|---|---|
| 0 | 0-1-2-3-4-5-6-7 |
| 1 | 1-2-3-4-5-6-7-0 |
| 2 | 2-3-4-5-6-7-1-0 |
| 3 | 3-4-5-6-7-2-1-0 |
| 4 | 4-5-6-7-3-2-1-0 |
| 5 | 5-6-7-4-3-2-1-0 |
| 6 | 6-7-5-4-3-2-1-0 |
| 7 | 7-6-5-4-3-2-1-0 |

APPARATUS AND METHOD FOR ORDERING TRANSACTION BEATS IN A DATA TRANSFER

CROSS-REFERENCE TO RELATED APPLICATIONS

This application claims the benefit of U.S. Provisional Application Ser. No. 60/700692, filed on Jul. 19, 2005, which is herein incorporated by reference for all intents and purposes.

This application is related to the following co-pending U.S. Patent Applications, all of which have a common assignee and common inventors.

| Ser. No. | FILING DATE | TITLE |
| --- | --- | --- |
| 11/364,704 (CNTR.2268) | Feb. 28, 2006 | APPARATUS AND METHOD FOR SPARSE LINE WRITE TRANSACTIONS |
| 11/363,826 (CNTR.2269) | Feb. 28, 2006 | MICROPROCESSOR APPARATUS AND METHOD FOR ENABLING VARIABLE WIDTH DATA TRANSFERS |
| 11/369,896 (CNTR.2270) | Mar. 7, 2006 | APPARATUS AND METHOD FOR QUAD-PUMPED ADDRESS BUS |
| 11/374,663 (CNTR.2271) | Mar. 13, 2006 | FLEXIBLE WIDTH DATA PROTOCOL |

BACKGROUND OF THE INVENTION

1. Field of the Invention

The present invention relates to microprocessor transactions, and more particularly to an apparatus and method for ordering transaction beats in a data transfer which solves the problem of stall cycles incurred by a microprocessor due to non-optimum ordering of cache line reads.

2. Description of the Related Art

In a present day microprocessor, such as an x86-compatible microprocessor, transactions (i.e., read and write transactions) to/from memory are accomplished over a system bus. These transactions include a request phase and a data (i.e., response) phase. During the request phase, an address for a transaction along with the transaction type are provided over an address signal group. The address signal group typically includes an address bus, a set of corresponding address strobe signals, and a request bus. During the data phase, data corresponding to the transaction is transferred over a data signal group. The data signal group typically includes a data bus, a set of corresponding data strobe signals, a response bus (indicating the type of response), and bus control signals. In one particular conventional configuration, the data signal group includes about 72 or so signals. Many conventional configurations support "quad-pumped" transactions in which an entire cache line (e.g., eight quadwords for a 64-byte cache line) is transferred across the bus in just a few cycles (e.g., two clock cycles) of a bus or system clock. During this type of transfer, data strobe signals are provided to indicate the validity of various quadword beats on the data bus so that several beats are transferred during each bus clock cycle.

In an x86-compatible processor, the request phase consists of two sub-phases: Request A and Request B. During the Request A sub-phase, the address of the transaction along with the transaction type is put out over the address signal group. During sub-phase B, other data associated with the transaction, such as the attribute of the transaction (e.g., write combined write to memory) and its length, are put out over the address signal group.

On loads (i.e., a data read request), the critical quadword (i.e., the quadword whose address is provided during the request A phase over the address signal group) is transferred during the first beat A, and the remaining quadwords are ordered for the remaining beats B-H according to interleaved ordering protocol. Interleaved ordering of quadwords for transfer of a cache line from memory is an artifact of older memory configuration schemes that enabled every other quadword (or whatever size data entity—e.g., doubleword—according to bus architecture) to be fetched from an alternate DRAM bank, thereby precluding wait states that were normally associated with fetching two consecutive addresses from the same DRAM bank. Albeit that wait states were precluded in older DRAM designs by using interleaved ordering, DRAM improvements have enabled system designers to provide for other types of ordering, such as linear ordering as described hereinbelow.

Today's state of the art for burst transfers over a data bus allows for only a single type of transfer order. For example, one processor configuration allows for interleaved ordering while a different processor configuration allows for linear ordering. And the present inventor has observed that in the majority of cases, linear ordering is optimal from the standpoint of data proximity. Accordingly, a linearly ordered system bus provides for transfer of data in a manner that minimizes processing stalls due to cache line reads. But while linear ordering may be optimal in many cases, it is very detrimental (i.e., numerous pipeline stalls are incurred) in other cases, such as when the critical quadword is the last quadword rather than the first. From the standpoint of data proximity, linear ordering maximizes the number of stalls, whereas interleaved ordering may provide superior performance.

Consequently, it is desirable to provide a protocol mechanism which allows for data entity transfer ordering to be specified dynamically as part of a request phase for a cache line read. It is furthermore desirable to provide apparatus and methods that enable dynamic specification of transfer order, while remaining compatible with existing and legacy bus protocols. Furthermore, it is desirable to provide a technique for specifying a custom data entity transfer protocol that can be dynamically specified for a cache line or other type of transfer.

SUMMARY OF THE INVENTION

A microprocessor according to an embodiment of the present invention includes a cache memory and bus interface logic. The bus interface logic is interfaced with request signals and data signals on a system bus and includes a request interface and a response interface. The request interface provides a request via the request signals for a data transaction, where the request signals provide for specification of a plurality of burst orders for a burst transfer, and where in which the request specifies one of the plurality of burst orders. The response interface stores data for the burst transfer received via the data signals into the cache memory according to the one of the plurality of burst orders. The request interface specifies the one of the plurality of burst orders by configuring a field of a request packet during a request phase of the data transaction. The one of the plurality of burst orders is selected from an interleaved order, a linear order, a nibble linear order, and a custom order. The custom order is programmed during initialization of the microprocessor. The request interface includes one or more machine specific registers to enable configuration of a custom order table.

The microprocessor may further include instruction logic which provides an instruction to the bus interface logic specifying the one of the plurality of burst orders.

The request interface may include request logic which specifies the one of the plurality of burst orders and request buffers coupled to the request logic and interfacing the request signals. In one embodiment, the request logic is pre-configured to specify the one of the plurality of burst orders during initialization. In another embodiment, the request logic is programmed during initialization to specify the one of the plurality of burst orders.

The response interface may include response buffers interfaced with the data signals, a cache bus coupled to the response buffers and to the cache memory, and ordering logic. The ordering logic is coupled to the cache bus and operates to store data for the burst transfer received via the response buffers into the cache memory according to the one of the plurality of burst orders. The ordering logic may include interleaved logic which stores data into the cache memory according to interleaved order, linear logic which stores data into the cache memory according to linear order, nibble linear logic which stores data into the cache memory according to nibble linear order, and custom logic which stores data into the cache memory according to a custom ordering.

A microprocessor interface system according to an embodiment of the present invention includes a system bus having a request bus and a data bus, a microprocessor, and a bus agent. The microprocessor includes a cache memory, request logic and response logic. The request logic is coupled to the request bus and provides a request for a data transaction on the request bus, where the request bus provides for specification of a plurality of burst orders for a burst transfer, and where the request specifies one of the plurality of burst orders for the data transaction, and where the request logic configures a field of a request packet to specify the one of the plurality of burst orders and provides the request packet onto the request bus. The response logic is coupled to the cache memory and the data bus and stores data for the burst transfer received from the data bus into the cache memory according to the one of the plurality of burst orders. The bus agent is coupled to the system bus, receives the request, and provides the data for the data transaction onto the data bus according to the one of the plurality of burst orders. The bus agent may include bus interface logic configured for dynamic burst ordering. The one of the plurality of burst orders is selected from an interleaved order, a linear order, a nibble linear order, and a custom order. The custom order is programmed during initialization of the microprocessor into one or more machine specific registers.

A method of dynamically ordering data beats in a data transaction according to an embodiment of the present invention includes, during initialization of a microprocessor, programming a plurality of burst orders that are allowable that includes a custom order programmed into one or more machine specific registers; configuring a request for data burst data transaction, where the request provides for specification of the plurality of burst orders, and where the request specifies one of the plurality of burst orders, providing the request for the burst data transaction onto a system bus during a request phase, receiving data from the system bus during a corresponding data phase of the burst data transaction, and storing the data according to the one of the plurality of burst orders, and wherein the configuring a request for a data transaction with one of the plurality of burst orders comprises configuring a field of a request packet. The method includes configuring the request according to a selected one of interleaved order, linear order, nibble linear order, and a custom order.

The method may include providing a load instruction which specifies the one of the plurality of burst orders. The method may include pre-configuring request logic with the one of the plurality of burst orders. The method may include programming request logic upon initialization according to the one of the plurality of burst orders. The method may include storing the data according to a selected one of an interleaved order, a linear order, a nibble linear order and a custom order.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present inventor has noted that noted that non-optimum ordering of cache line read transactions of a microprocessor results in stalled cycles. He has therefore developed apparatus and method for dynamically ordering transaction beats in a data transfer while remaining compatible with existing and legacy bus protocols, and for specifying a custom data entity transfer protocol that can be dynamically specified for a cache line or other types of transfers, as will be further described below with respect to FIGS. 1-9.

Figure 1:
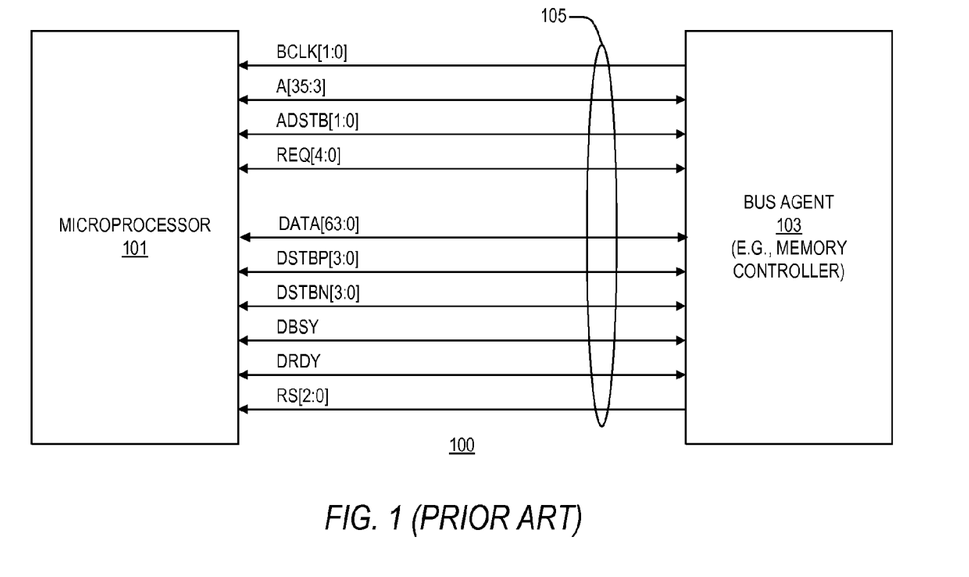
FIG. 1 is a simplified block diagram of a conventional microprocessor interface system.

FIG. 1 is a simplified block diagram of a conventional microprocessor interface system 100. The microprocessor interface system 100 includes a microprocessor 101 and a bus agent 103 interfaced with a system bus 105. The bus agent 103 represents any number of different types of bus agents as known to those skilled in the art, such as a memory controller, a host/PCI (Peripheral Component Interconnect) bridge, chipset, etc. The system bus 105 includes the signals for performing data transactions, including a bidirectional address bus A, a bidirectional data bus DATA, and multiple control signals. In the illustrated embodiment, the A bus has 33 signals shown as A[35:3] and the DATA bus has 64 signals shown as DATA[63:0], although it is understood that the address and data buses may have any suitable number of signals depending upon the particular configuration and architecture. One skilled in the art will appreciate that the least significant address signals (A[2:0]) are not required to allow for transfer of data with quadword granularity, which is the present state of the art.

The control signals include a differential clock bus BCLK [1:0], a bidirectional address strobe bus ADSTB[1:0] (indicating validity of the addresses on the A bus), a bidirectional request (REQ) bus with signals REQ[4:0] specifying the type of transaction requested (e.g., memory code read, memory data read, memory line write, memory quadword write with byte enables), a pair of data strobe buses DSTBP[3:0] and DSTBN[3:0], a bidirectional data bus busy signal DBSY (asserted by the entity that is providing data on the DATA bus), a data ready signal DRDY (asserted by either the device providing data during all clock cycles that data is transferred over the DATA bus), and a response bus RS[2:0] which provides the type of transaction response (e.g., no data, normal data, implicit writeback) that is being completed over the DATA bus. In the illustrated embodiment, the RS bus has 3 signals shown as RS[2:0] and is asserted by the bus agent 103.

The signals shown for the conventional microprocessor interface system 100 are provided in virtually all present day microprocessors with minor variation. Some processors multiplex addresses and data over the same signal group and thus provide control signals to indicate whether data or addresses are present. Other microprocessors utilize different address or data bus widths or control signals alternatively named. Still further, addresses and/or data may be multiplexed over a smaller bus size than those illustrated by the conventional microprocessor interface system 100. What is important to note is that substantially all processors provide signals for communication with bus agents to indicate what type of transaction is requested, the parameters of that transaction, and to transmit/receive the data.

In a present day microprocessor, including the microprocessor 101, data can be transferred on a cache line basis (e.g., eight quadwords for a 64-byte cache line) according to a "quad-pumped" configuration. When transferring an entire cache line, two cycles of the bus clock signals BCLK[1:0] are used to transfer the eight associated quadwords in a cache line. Accordingly, four quadwords are transferred during each cycle of the bus clock BCLK[1:0], thus accounting for the descriptor "quad-pumped." During this type of data transfer, the signals of the data strobe buses DSTBP[3:0], DSTBN[3: 0] are provided to indicate the validity of various quadword beats on the data bus so that 4 beats are transferred during a single bus clock (each "beat" including the 64 bits of the DATA bus).

Figure 2:
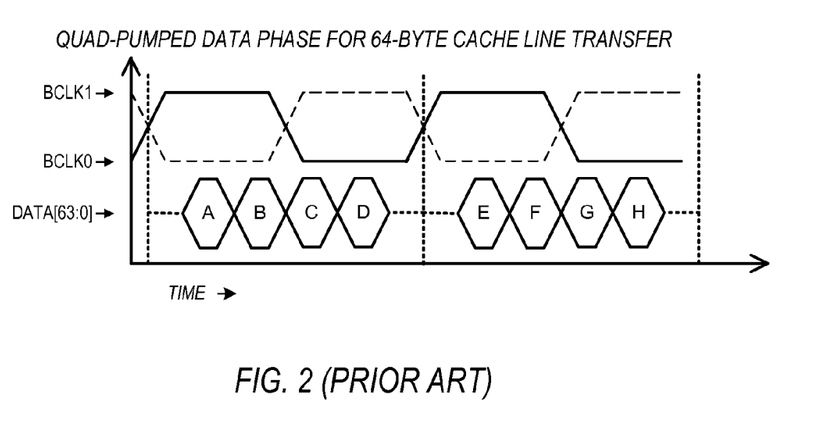
FIG. 2 is a timing diagram showing the interaction of the signals within the data signal group described with reference to the conventional microprocessor interface system of FIG. 1 for performing the data phase of a data transaction.

FIG. 2 is a timing diagram showing the interaction of the signals within the data signal group described with reference to the conventional microprocessor interface system 100 for performing the data phase of a data transaction. Operation of such transactions and corresponding signals as named herein in an x86-compatible microprocessor are described in numerous references, one of which is the book "The Unabridged Pentium® 4 IA32 Processor Genealogy, 1st Edition," by Tom Shanley. For clarity, assertion of the control signals is shown as a logic low level, although one skilled in the art will appreciate that assertion can as well be indicated by a logic high level. Cycles of the differential bus clock BCLK[1:0] are shown across the top of the timing diagram, in which BCLK [1] is shown using a dashed line and which toggles with opposite polarity as the BCLK[0] signal.

As noted above, the current state of the art provides for a 64-bit DATA bus that supports transfer during the data phase of a 64-byte cache line over two cycles of the bus clock BCLK[1:0]. The transfer of a single quadword (i.e., eight bytes) over the 64-bit data bus is known as a beat and 4 beats A-D, E-H are transferred during each cycle of the bus clock BCLK[1:0]. On loads (i.e., a data read request), the critical quadword (i.e., the quadword whose address is provided during the request A phase over the address signal group) is transferred during the first beat A, and the remaining quadwords are ordered for the remaining beats B-H according to interleaved ordering protocol.

Figure 3:
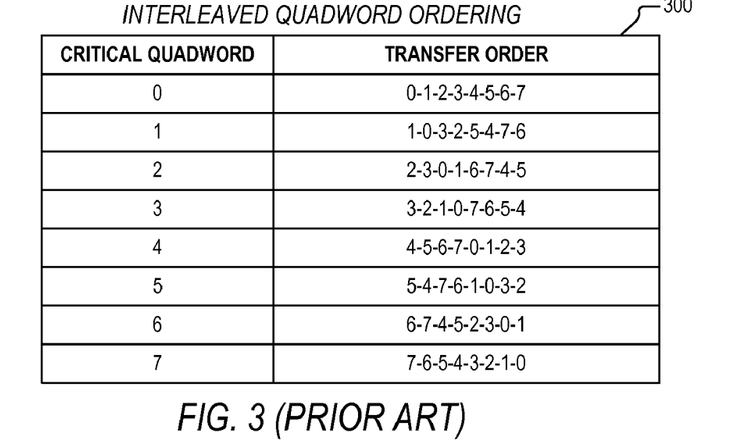
FIG. 3 is a diagram of a table illustrating interleaved ordering protocol for burst transfer of eight data entities 0-7 over the system bus of FIG. 1.

FIG. 3 is a diagram of a table 300 illustrating interleaved ordering protocol for burst transfer of eight data entities 0-7 over the system bus 105. Interleaved ordering of quadwords for transfer of a cache line from memory is an artifact of older memory configuration schemes that enabled every other quadword (or whatever size data entity—e.g., doubleword—according to bus architecture) to be fetched from an alternate DRAM bank, thereby precluding wait states that were normally associated with fetching two consecutive addresses from the same DRAM bank. Albeit that wait states were precluded in older DRAM designs by using interleaved ordering, DRAM improvements have enabled system designers to provide for other types of ordering, such as linear ordering and other orderings as described further below.

Conventional systems that perform burst transfers over a data bus allows for only a single type of transfer order. For example, one processor configuration allows for interleaved ordering as illustrated in table 300. And the present inventor has observed that in the majority of cases, linear ordering is optimal from the standpoint of data proximity. Accordingly, a linearly ordered system bus provides for transfer of data in a manner that minimizes processing stalls due to cache line reads. While linear ordering may be optimal in many cases, however, linear ordering is very detrimental (i.e., numerous pipeline stalls are incurred) in some cases. For example, consider transfer of a cache line where quadword 7 is the critical quadword. From the standpoint of data proximity, linear ordering maximizes the number of stalls. For this case, perhaps interleaved ordering is more optimal.

Consequently, it is desirable to provide a protocol mechanism which allows for data entity transfer ordering to be specified dynamically as part of a request phase for a cache line read. It is furthermore desirable to provide apparatus and methods that enable dynamic specification of transfer order, while remaining compatible with existing and legacy bus protocols. Furthermore, it is desirable to provide a technique for specifying a custom data entity transfer protocol that can be dynamically specified for a cache line or other type of transfer. A bus protocol according to an embodiment of the present invention comports with present day x86-compatible bus architectures that employ request A and request B packets via the REQ bus as described with reference to FIGS. 1 and 2.

Moreover, a protocol according to an embodiment of the present invention provides for dynamic specification of burst ordering by employing the DSZ field of a request B packet, which utilizes the REQ[4:3] signals as described herein.

Figure 4:
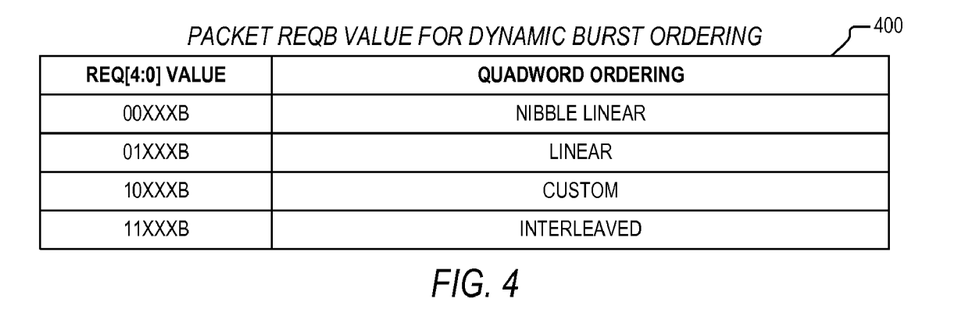
FIG. 4 is a table illustrating several values of signals of the REQ bus and corresponding quadword ordering of a request B packet according to an exemplary embodiment of the present invention supporting dynamic burst ordering.
Figure 5:
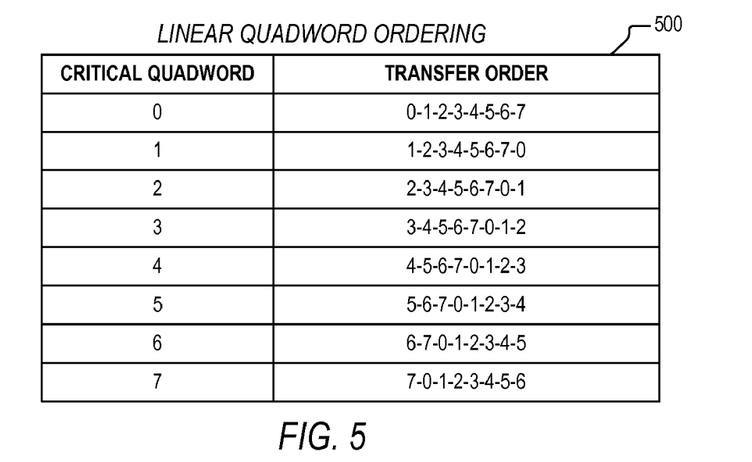
FIG. 5 is a diagram of a table illustrating linear ordering protocol.
Figure 6:
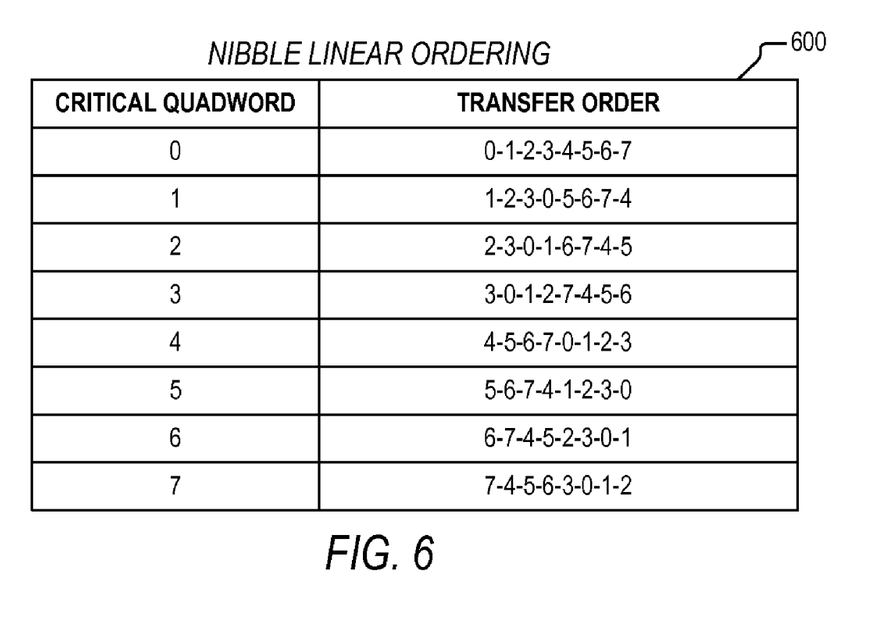
FIG. 6 is a diagram of a table illustrating nibble linear ordering protocol.

FIG. 4 is a table 400 illustrating several values of the REQ[4:3] signals of the REQ bus and corresponding quadword ordering of a request B packet according to an exemplary embodiment of the present invention supporting dynamic burst ordering. The remaining signals REQ[2:0] of the REQ bus are shown as "X" values indicating that they are unspecified or "don't care" values. A "B" appended to the value indicates a binary value. As shown in table 400, setting the REQ[4:3] signals to 00B requests that the ordering corresponding to a prescribed read transfer be nibble linear ordering, as shown in table 600 of FIG. 6. Setting the REQ[4:3] signals to 01B requests that the ordering corresponding to a prescribed read transfer be linear ordering, as shown in table 500 of FIG. 5. Setting the REQ[4:3] signals to a value of 11B specifies that the ordering corresponding to a prescribed read transfer be interleaved, as shown in table 300. And setting the REQ[4:3] signals to 10B specifies that the ordering corresponding to a prescribed read transfer be custom ordering, such as that shown in table 700 of FIG. 7. Responsive to a transaction request according to the present invention, the remaining phases of a read transaction are executed in a manner such that data entities are transferred according to the specified ordering scheme.

Figure 7:
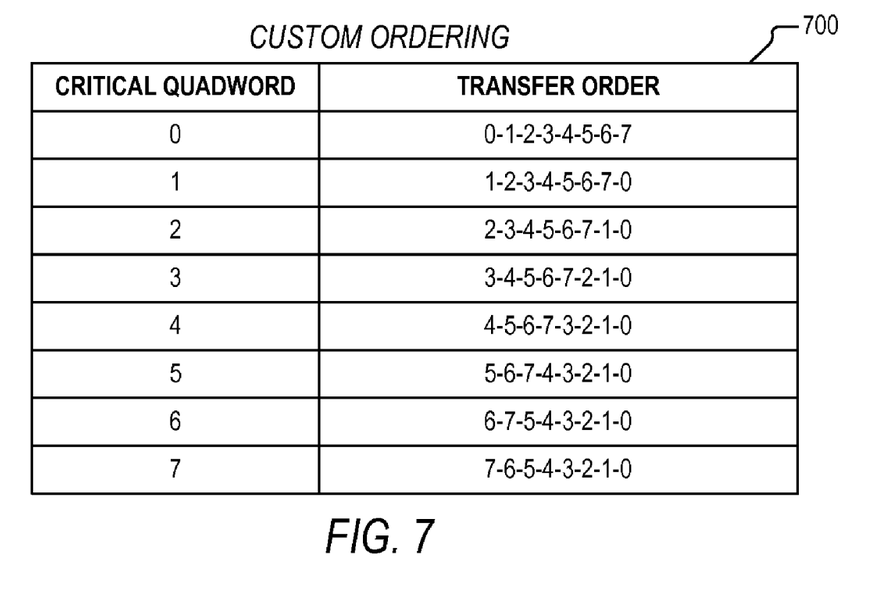
FIG. 7 is a diagram of a table illustrating an exemplary custom ordering protocol.

Table 700 illustrates an exemplary custom ordering scheme for burst transfer of eight data entities 0-7 over the system bus 105 according to an embodiment of the present invention. One skilled in the art will appreciate that custom ordering according to embodiments of the present invention contemplates any conceivable ordering of data entities, to include special purpose transfers where less than an entire cache line is transferred and where one or more entities are transferred in duplicate. It is noted that the interleaved, linear, and nibble linear orderings follow particular patterns as understood by those skilled in the art. For the interleaved ordering, in subsequent orderings, the order of each quadword or pairs of quadwords or groupings of four quadwords are swapped. For example, for the second ordering numbered "1" in which the second quadword number 1 is the critical quadword, quadword 1 is swapped with quadword 0, quadword 3 is swapped with quadword 2, and so on. For the linear quadword ordering, the ordering is similar to a first-in, first out (FIFO) queue in which the first are re-ordered to the last position. Thus, if quadword 1 is the critical quadword, then quadword 0 is reordered to last place (i.e., 1-2-3-4-5-6-7-0) and if quadword 2 is the critical quadword, then quadword 1 is reordered to last place (2-3-4-5-6-7-0-1) and so on. Nibble linear ordering is similar to linear ordering except that the quadwords are handled in groups of four. On the other hand, custom ordering is an arbitrary ordering determined by the designer or by a user depending upon the particular implementation.

Figure 8:
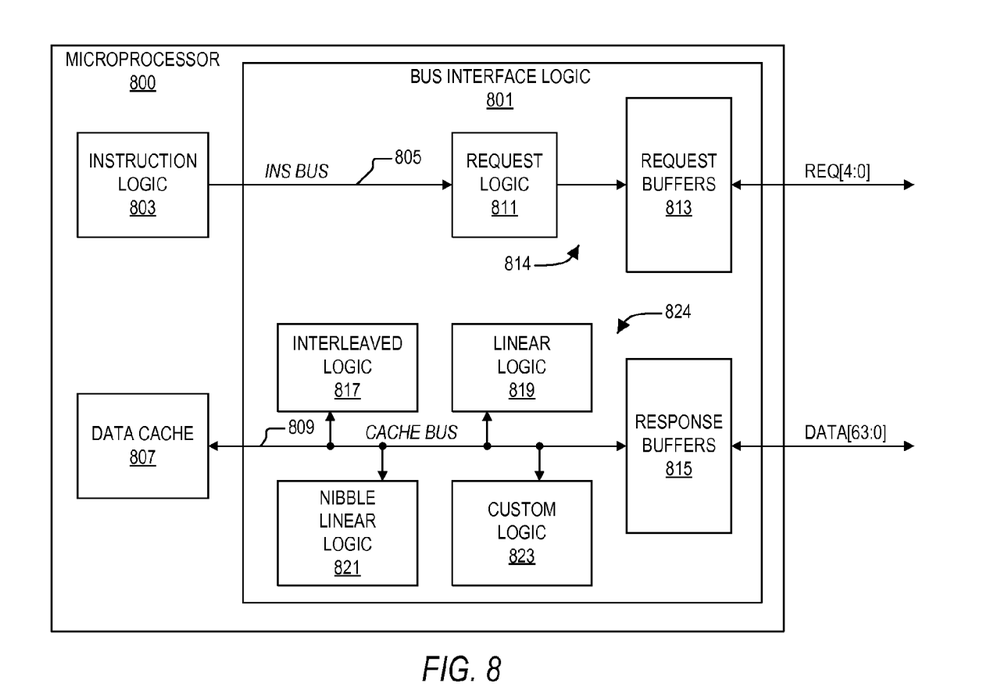
FIG. 8 is a block diagram of a microprocessor including bus interface logic which enables the microprocessor to achieve dynamic burst ordering according to an exemplary embodiment of the present invention.

FIG. 8 is a block diagram of a microprocessor 800 including bus interface logic 801 which enables the microprocessor 800 to achieve dynamic burst ordering according to an exemplary embodiment of the present invention. The bus interface logic 801 is coupled to the system bus 105 which includes the DATA bus (signals D[63:0]) and the REQ bus (signals REQ[4:0]). The microprocessor 800 includes instruction logic 803 providing instructions via an instruction bus (INS BUS) 805 to the bus interface logic 801. The microprocessor 800 includes a data cache 807 coupled to a cache bus 809. Instructions such as load and store instructions are provided from the instruction logic 803 to the bus interface logic 801. The bus interface logic 801 generates corresponding requests to the system bus 105 via the REQ bus and transfers data entities (e.g., quadwords) to/from the system bus 105 via the DATA bus.

In operation, when a load instruction is received over the instruction bus 805 by the bus interface logic 801, fields within the instruction specify the burst order for the corresponding load operation. Alternatively, request logic 811 within the bus interface logic 801 is configured during initialization (e.g., reset or power up) of the microprocessor 800 to always specify a particular burst order. In another embodiment, during initialization, BIOS instructions configure or otherwise program the request logic 811. In one embodiment, the request logic 811 includes one or more machine specific registers to construct allowable burst orders and to enable configuration of a custom order table (e.g., as illustrated by custom ordering table 700). In one embodiment, the configuration of the microprocessor 800 and the types of orders provided for are communicated to the system bus 105 and bus agents thereon during system initialization over the system bus itself or via a side bus (not shown) such as an I2C bus or the like.

Thereafter, according to any of the above embodiments, when a load operation is specified via an instruction from the instruction logic 803, the request logic 811 configures the DSZ field of a request B packet for the prescribed transaction request according to the specified burst order and provides this to request buffers 813 coupled to the request logic 811. The request buffers 813 send the request B packet on the REQ bus of the system bus 105. The request logic 811 and the request buffers 813 collectively for a request interface 814 which provides a request for a data transaction in which the request specifies a selected burst order.

When the data phase of the transaction occurs, corresponding data entities within the burst transfer are provided from the system bus 105 to response buffers 815 of the microprocessor 800 externally interfacing the DATA bus and internally interfacing the cache bus 809. According to the burst ordering of the transaction type, one of four exemplary order processing logic elements operate to provide the received data entities properly to the data cache 807 via the cache bus 809. The exemplary processing logic elements include interleaved logic 817, linear logic 819, nibble linear logic 821, and custom logic 823, each coupled to the cache bus 809. If the specified order is interleaved, then the interleaved logic 817 provides the data entities as they arrive to the data cache 807. The response buffers 815 and the ordering logic 817, 819, 821 and 823 collectively form a response interface 824 which stores received data into the data cache 807 according to the selected burst order. If the specified order is linear, then the linear logic 819 provides the data entities as they arrive to the data cache 807. If the specified order is nibble linear, then the nibble linear logic 821 provides the data entities as they arrive to the data cache 807. And if the specified order is custom, then the custom logic 823 provides the data entities as they arrive to the data cache 807. In one embodiment, ordering tables are provided within each of the four receive processing logic elements. In an alternative embodiment, the orders are prescribed within the bus interface logic 801. In a third embodiment, the orders are programmed during initialization in machine specific registers (not shown) and are provided to the bus interface logic 801.

Figure 9:
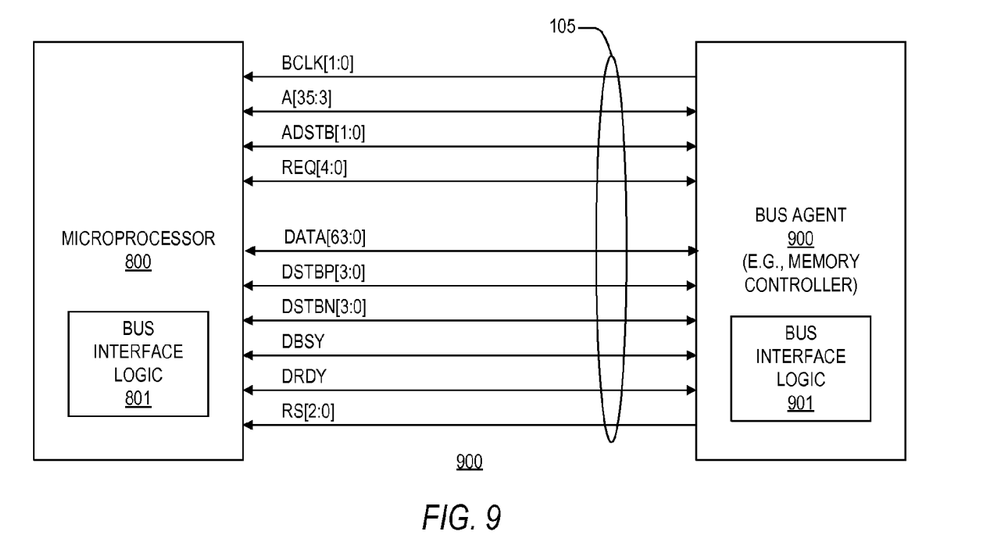
FIG. 9 is a simplified block diagram of a microprocessor interface system employing the microprocessor of FIG. 8 and a bus agent configured to support dynamic burst ordering according to an exemplary embodiment of the present invention.

FIG. 9 is a simplified block diagram of a microprocessor interface system 900 according to an exemplary embodiment of the present invention. The microprocessor interface system 900 is similar to the conventional microprocessor interface system 100 except that the microprocessor 101 is replaced with the microprocessor 800 and the bus agent 103 is replaced with a bus agent 900. The system bus 105 is included for interfacing the microprocessor 800 with the bus agent 900. The microprocessor 800 includes the bus interface logic 801 which enables the microprocessor 800 to achieve dynamic burst ordering according to an exemplary embodiment of the present invention. The bus agent 900 includes bus interface logic 901 which enables the bus agent 900 to achieve dynamic burst ordering according to an exemplary embodiment of the present invention. The bus interface logic 901 is configured to be compatible with the bus interface logic 801 to provide quadwords on the DATA bus that are ordered according to the burst ordering specified by the bus interface logic 801 via a request B packet provided on the REQ bus as previously described.

An apparatus and method for ordering transaction beats in a data transfer according to an embodiment of the present invention is particularly advantageous for embedded applications because a custom burst transfer order can be configured and dynamically employed to optimize cache line fills for the specific applications that are executing on an embedded processor. The present invention also provides advantages to operating systems whereby particular well-known applications can be executed such that burst transfers are executed with minimal stalls due to cache line transfers.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor, for dynamically specifying a data transaction burst order for a burst transfer, the microprocessor comprising:
   a cache memory; and
   bus interface logic, interfaced with request signals and data signals on a system bus, comprising:
      a request interface which provides a request via said request signals for a data transaction, wherein said request signals provide for specification of a plurality of burst orders for the burst transfer, and wherein said request specifies one of said plurality of burst orders, and wherein said request interface specifies said one of said plurality of burst orders by configuring a field of a request packet during a request phase of said data transaction, said request interface comprising:
         one or more machine specific registers to enable configuration of a custom order table; and
      a response interface, coupled to said cache memory, which stores data for the burst transfer received via said data signals into said cache memory according to said one of said plurality of burst orders;
   wherein said one of said plurality of burst orders is selected from an interleaved order, a linear order, a nibble linear order, and a custom order, and wherein said custom order is programmed into said custom order table during initialization of the microprocessor.

2. The microprocessor of claim 1, further comprising instruction logic which provides an instruction to said bus interface logic specifying said one of said plurality of burst orders.

3. The microprocessor of claim 1, wherein said request interface comprises request logic which specifies said one of said plurality of burst orders and request buffers coupled to said request logic and interfacing said request signals.

4. The microprocessor of claim 3, wherein said request logic is preconfigured to specify said one of said plurality of burst orders during initialization.

5. The microprocessor of claim 3, wherein said request logic is programmed during initialization to specify said one of said plurality of burst orders.

6. The microprocessor of claim 1, wherein said response interface comprises:
   response buffers interfaced with said data signals;
   a cache bus coupled to said response buffers and to said cache memory; and
   ordering logic, coupled to said cache bus, which stores data received via said response buffers into said cache memory according to said one of said plurality of burst orders.

7. The microprocessor of claim 6, wherein said ordering logic comprises:
   interleaved logic which stores data into said cache memory according to said interleaved order;
   linear logic which stores data into said cache memory according to said linear order;
   nibble linear logic which stores data into said cache memory according to said nibble linear order; and
   custom logic which stores data into said cache memory according to said custom order.

8. A microprocessor interface system, for dynamically specifying a data transaction burst order for a burst transfer, comprising:
   a system bus including a request bus and a data bus;
   a microprocessor, comprising:
      a cache memory;
      request logic, coupled to said request bus, which provides a request for a data transaction on said request bus, wherein said request bus provides for specification of a plurality of burst orders for the burst transfer, and wherein said request specifies one of said plurality of burst orders for said data transaction, and wherein said request logic configures a field of a request packet to specify said one of said plurality of burst orders and provides said request packet onto said request bus, said request logic comprising:
         one or more machine specific registers to enable configuration of a custom order table; and
      response logic, coupled to said cache memory and said data bus, which stores data for the burst transfer received from said data bus into said cache memory according to said one of said plurality of burst orders; and
   a bus agent coupled to said system bus which receives said request and which provides said data for said data transaction onto said data bus according to said one of said plurality of burst orders;
   wherein said one of said plurality of burst orders is selected from an interleaved order, a linear order, a nibble linear order, and a custom order, and wherein said custom order is programmed into said custom order table during initialization of said microprocessor.

9. The microprocessor interface system of claim 8, wherein said bus agent comprises bus interface logic configured for dynamic burst ordering.

10. A method of dynamically ordering data beats in a burst data transaction, comprising:
   during initialization of a microprocessor, programming a plurality of burst orders that are allowable, the plurality of burst orders including a custom order that is programmed into one or more machine specific registers;

configuring a request for the burst data transaction, wherein the request provides for specification of the plurality of burst orders, and wherein the request specifies one of the plurality of burst orders, and wherein said configuring a request for the burst data transaction with one of the plurality of burst orders comprises configuring a field of a request packet, and wherein said configuring a request for the burst data transaction with one of the plurality of burst orders comprises configuring the request according to a selected one of interleaved order, linear order, nibble linear order and the custom order;

providing the request for the burst data transaction onto a system bus during a request phase;

receiving data from the system bus during a corresponding data phase of the burst data transaction; and storing the data according to the one of the plurality of burst orders.

11. The method of claim 10, further comprising providing a load instruction which specifies the one of the plurality of burst orders.

12. The method of claim 10, further comprising pre-configuring request logic with the one of said plurality of burst orders.

13. The method of claim 10, further comprising programming request logic upon initialization according to the one of the plurality of burst orders.

14. The method of claim 10, wherein said storing the data according to the one of the plurality of burst orders comprises storing the data according to a selected one of an interleaved order, a linear order, a nibble linear order and a custom order.

* * * * *